July 11, 1950 F. P. WILLCOX 2,514,919
BUILT-IN FLASH SYNCHRONIZER FOR SETTING
TYPE PHOTOGRAPHIC SHUTTERS
Filed Oct. 24, 1947 2 Sheets-Sheet 1
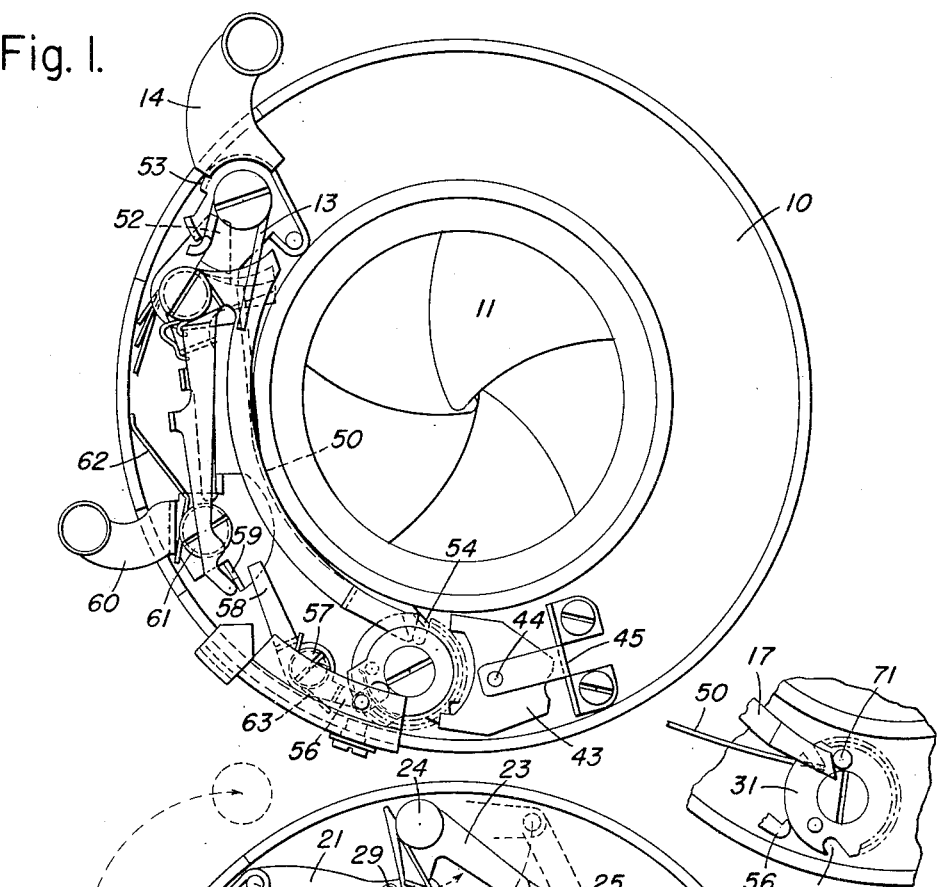
Fig. 1.
Fig. 6.
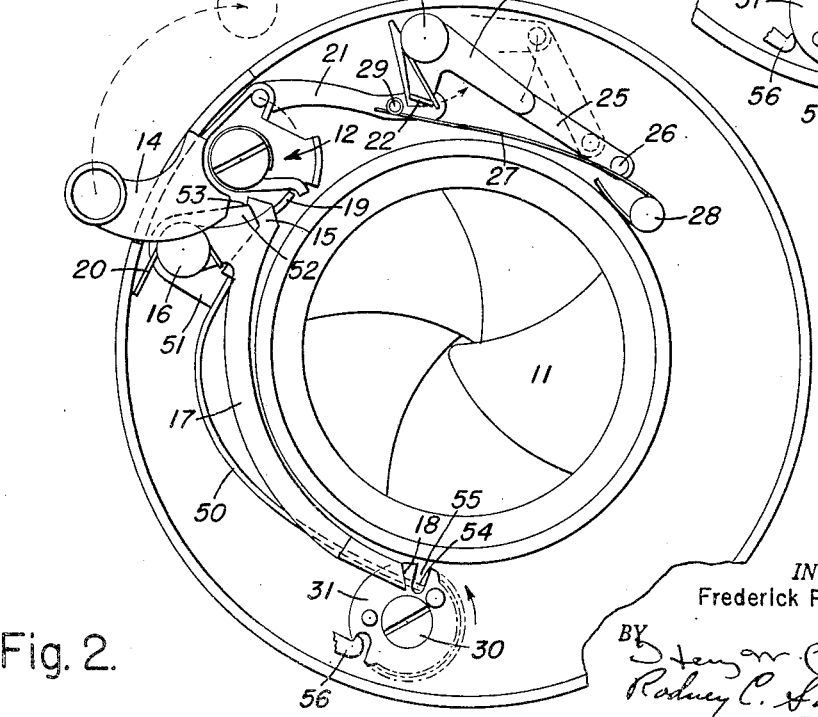
Fig. 2.
INVENTOR.
Frederick P. Willcox
BY
ATTORNEYS

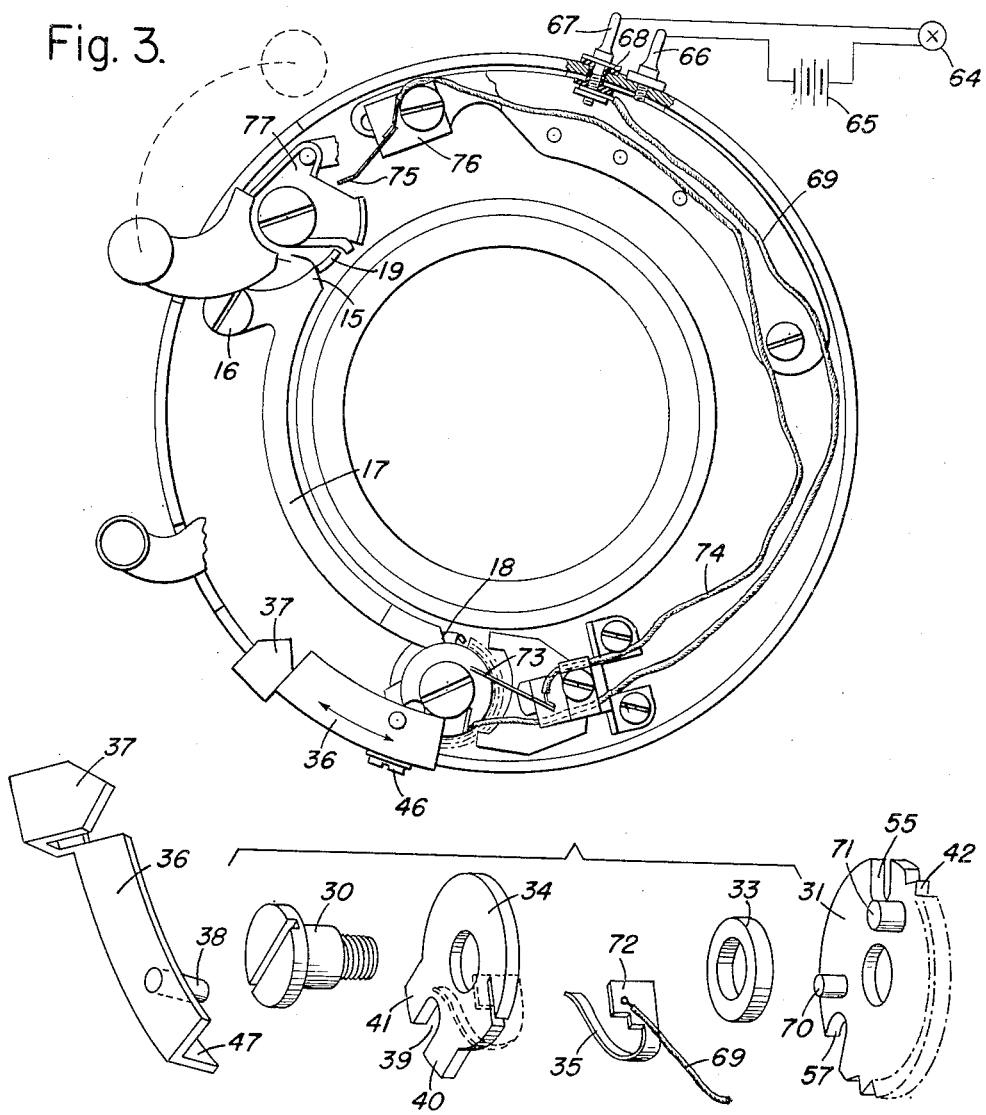
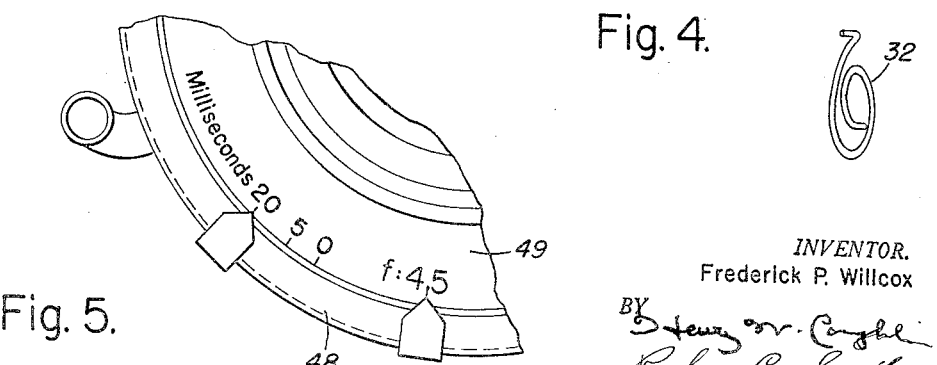
INVENTOR.
Frederick P. Willcox
ATTORNEYS

Patented July 11, 1950

2,514,919

UNITED STATES PATENT OFFICE 2,514,919

BUILT-IN FLASH SYNCHRONIZER FOR SETTING TYPE PHOTOGRAPHIC SHUTTERS

Frederick P. Willcox, Bethesda, Md., assignor to General Aniline & Film Corporation, New York, N. Y., a corporation of Delaware Application October 24, 1947, Serial No. 781,821

7 Claims. (Cl. 95—11.5)

This application pertains to an invention in flash synchronizers for photographic shutters.

Among the objects of the invention is that of devising a flash synchronizer for a photographic shutter which shall be relatively simple, easily housed within the ordinary shutter casing, and inexpensive to produce.

Another object of the invention is that of devising a flash synchronizer which shall always comprise a part of the shutter release mechanism, but which shall be simple and trouble-proof so that even after an extended period of usage, the parts thereof will not become worn or otherwise deteriorate to alter the timing of the release cycle.

Another object of the invention is that of providing a flash synchronizer which shall move very slowly and through only a part of a revolution in passing through its complete cycle and and which shall operate through a spring tensioned by and at the same time the master member is set.

Another object of the invention is that of devising a flash synchronizer which shall function through a spring set by the same means which serves to tension the master member, and which, upon release of the master member, shall serve as an additional spring means to accelerate the movement of the master member.

Other objects of the invention will become apparent from the following more complete disclosure.

The synchronizer to which this case applies is illustrated and will be described in detail as it is applied to a shutter of the type described in my copending application Serial No. 754,631, filed June 14, 1947. The principles of the invention are equally applicable to other shutters of similar type generally known as between-the-lens shutters, and the synchronizer may be applied with equal effectiveness to shutters having master members and releasing means which take a somewhat different form.

The master member, as is the usual practice in shutters of this type which are to be preset before each exposure is effected, is set by movement of a lever or other means projecting from the shutter casing and by which the master member is moved throughout a predetermined extent until it has tensioned the spring or other driving means and has become latched or otherwise temporarily secured in that set position. The releasing means is actually withdrawn from engagement with the master member by the synchronizer itself after the parts thereof have moved throughout practically the full extent of their travel. The synchronizer is always connected within and forms a part of the chain of mechanism between the releasing lever or other releasing means and the means by which the master member is unlatched preparatory to effecting an opening and closing movement of the shutter blades.

This synchronizer is unique in that although it may be set to provide the necessary time delay or lag for bulbs of any conventional type, it is movable only through a relatively small angular extent. That movement is confined to much less than one-half revolution for the parts and is controlled by a pallet in engagement with teeth about a partial circumference of the synchronizer timing disk, this partial disk in which teeth are cut serving as a star wheel to be engaged by the said pallet. The pallet is similar to that usually found in retarding trains and thus intermediate gears are not necessary and, therefore, the member of parts and cost of the mechanism is kept at a minimum. The synchronizer mechanism, practically all parts of which are mounted on a single stud or pivot, further comprises a block of non-conducting material to which is attached a spring contact member, and which is adjustable to position the spring contact member for earlier or later engagement within the cycle of release depending upon the number of milliseconds lag for which it is necessary to provide. This insulating block and the circuit within the shutter casing are so designed that the circuit is preferably completed through ground to the casing for all finite values of lag. For instantaneous type discharge tubes which have a substantially zero lag, the insulating block and its contact member are set so that no contact is effected between the spring member above mentioned and a cooperating projection from the timing disk. However, at the zero lag setting, a part of the contact means within the synchronizer is moved to an extreme position in which the circuit is altered and connected through to a contact member adapted to be engaged by a part of the master member or some other similar part of the blade operating mechanism thereby dispensing with the contact as effected at the synchronizer itself, and coupling the direct movement of the shutter operating parts themselves.

The timing disk for the synchronizer is normally urged in a direction to engage a releasing latch or catch by a relatively weak spring, but when the master member is tensioned, contact is made with a heavier leaf type spring extending from the vicinity of the master member to the synchronizer timing disk and that spring is bowed or tensioned so that upon release of the timing disk, its tension which is considerably in excess of the light return spring above mentioned, causes the timing disk to rotate as governed by the pallet thereby to effect contact for flashing the bulb and to release the master member and thus actuate the shutter.

Now referring to the accompanying figures of drawing wherein identical reference numerals refer to like parts, a more detailed description of one particular embodiment of the invention will be given, in which:

Fig. 1 is a view showing parts of a shutter mechanism to which the novel synchronizer has been applied.

Fig. 2 is a view similar to Fig. 1 showing the master member in set position and the synchronizer tensioned and in readiness to release the shutter.

Fig. 3 is a plan view of the shutter and synchronizer mechanism shown in Figs. 1 and 2 further illustrating the circuit within the shutter casing and from that casing to the flash bulb and battery.

Fig. 4 is an exploded view of the movable retarding and contact parts which comprise the synchronizer and flash circuit completing assembly.

Fig. 5 is a fragmentary view of the front of the shutter casing, illustrating the manner in which the device may be set to accommodate flash bulbs or other flash means having different periods of lag.

Fig. 6 is a fragmentary view showing the synchronizer mechanism after release and after having passed through its cycle of a partial revolution to trip the release lever for the master member.

Referring to Figs. 1 and 2, the shutter, some parts of which are not shown, is enclosed within a casing 10 and comprises among other elements the usual blades 11, a blade ring or other blade interconnecting means (not shown) which is actuated by a master member generally indicated by numeral 12 and which is always urged toward the position of Fig. 1 by the spring 13. This master member is set by a lever 14 projecting from the casing 10 and movable from the position of Fig. 1 to that of Fig. 2. Upon such movement, the master member is latched in that set position by engagement of the nose 15 of a lever pivoted at 16 and having an elongated, arcuate extension 17 which is offset forwardly at its lower end and is provided thereat with a beveled cam edge 18. This latching lever is urged to a position in which the nose 15 engages behind a forwardly projecting lug 19 by spring 20. The lug 19 extends forwardly from a part of the master member 12. Upon movement of the parts from the release position of Fig. 1 to the position of Fig. 2, the lug 19 presses the latch lever out of the way to be engaged and restrained against return movement after the lug 19 has cleared the nose 15.

While the master member may impart its movement to the blades in any convenient manner, that movement is herein conveyed by means of a connecting link 21 releasably engageable with a lug 22 at one arm of a bell crank lever 23 pivoted at 24. That lever 23 is really part of a toggle mechanism of which the link 25 forms a part, that link being connected by pin 26 to a blade ring or other blade interconnecting and actuating means (not shown). A spring 27 coiled about stud 28 engages beneath a projecting pin 29 adjacent the free notched end of link 21 to maintain the same in engagement with the lug 22 except as these parts are disengaged during the setting movement of the master member, that disengagement being more fully described in copending application Serial No. 754,631, above mentioned.

The synchronizer mechanism, shown more fully in the exploded view, Fig. 4, is mounted for rotation about a single pivot herein comprising a shoulder stud 30. This synchronizer mechanism comprises a rotatable synchronizer timing disk 31, a tension spring 32 which always tends to return the disk to its initial or latched position, a spacer 33 and an insulating block 34 adapted to support the settable contact member 35 fixed thereto in a manner hereinafter more fully described. In addition to the parts just mentioned which are all carried by the stud 30, a segment 36 having a pointer or index member 37 is slotted for adjustment circumferentially of the shutter casing and has an inwardly projecting pin 38 engageable with the slot 39 between the forked projections 40 and 41 of the insulating block 34. This setting member 36 is adjustable as indicated in Fig. 5 and, depending upon the lag inherent in any particular flash bulb being employed, the setting of the pointer 37 opposite the appropriate value for that lag properly positions the contact member 35 so that the bulb will be flashed at the requisite point properly to precede the release of the shutter mechanism itself.

The timing disk 31 has teeth 42 about a part of its circumference and is engaged by a pallet 43 pivoted at 44 in a bracket 45 connected in any convenient manner to the mechanism plate or other appropriate support within the casing 10.

The setting member 36 by which the angular position of block 34 and its attached contact member is adjusted is held in position by a locking screw 46 which passes through the elongated slot at the outer flange 47 of the member 36 and is threaded into the casing 10. The pointer 37 is offset outwardly and forwardly so as to extend about the speed setting ring 48, Fig. 5. The graduations from zero to 20 or other maximum appear at the front of the casing or at the face plate 49 on which may also be found the diaphragm $f$-marks and the numerals indicating the speed settings.

For actuating the synchronizer, an elongated spring member 50 projects somewhat parallel to and is bent in more or less the same manner as the release lever 17. This spring 50 extends from a plate 51 which is also pivoted on the stud 16 and which projects forwardly as shown in Fig. 2 to terminate in a nose portion 52 engageable by a lug 53 which is a part of the master member 12. When the parts are in untensioned or unset position, as in Fig. 1, that shoulder or lug 53 is out of contact with the nose 52 and the spring 50 merely engages by a forwardly bent extension 54 within a notch 55 in the timing disk 31. At that time, the disk, under the influence of spring 32, will have been moved clockwise or to the return position in which a latch 56 engages within the notch 57 by which the synchronizer mechanism is held in position preparatory to release of the shutter.

This latch 56 is pivoted at 57 and extends to the other side of that pivot as an arm 58 to be engaged by the projecting lug 59 or some other part of the release lever 60 pivoted at 61 and tensioned by spring 62. The latch 56 is always urged in a direction to engage the notch 57 by spring 63, except when the lever 60 is moved in a counterclockwise direction at which time the projection or forwardly extending lug engages arm 58 thereby to withdraw the latch 56 against the tension of spring 63.

Movement of the parts to the position of Fig. 2 not only moves the master member to set position, but also rotates the plate 51 about pivot 16 so as to tension the spring 50 by putting a more pronounced bow or arc therein. It is to be understood that this spring may be preformed and need not be pretensioned although the amount of tension ultimately to be developed may vary with circumstances. Any spring member which might serve the purpose in a comparable fashion may be used. The setting of the master member does not move disk 31, but does put a great deal of additional tension in the spring so that it then becomes dominating influence upon the timer disk 31 since the force exerted thereby exceeds considerably the tension imposed by spring 32 which functions in the opposite direction. As the parts are disposed in Fig. 1, the spring 32 is strong enough to return the disk 31 to its latched position.

This spring 50 performs an additional function in that, upon shutter release, its tension is added to the tension in spring 13 and, therefore, affects the master member in addition to imparting movement to the disk 31. Thus, the fact that the release of the master member always comes about through the synchronizer does not throw a burden on the shutter operating mechanism, but rather assists or boosts the action of that mechanism.

Referring to Fig. 3, the flash bulb 64 is connected within a circuit in series with battery 65, said circuit being readily connectable to or disconnected from the shutter by a plug and jacks or prongs 66 and 67. The first of these is preferably grounded to the shutter casing while the jack 67 is insulated by any suitable non-conducting material 68 and connects through a wire 69 to the spring contact member 35 as illustrated in this Fig. 3 and also in Fig. 4. The wire is insulated and the end may be soldered or otherwise connected to the spring member 35. When the synchronizer is set at other than zero lag, contact is made through a projection or pin 70 on the disk 31 with the spring member 35 carried by the insulating block 34. That contact is made earlier or later in the cycle depending upon the amount of lag for which the synchronizer is to compensate. Of course, the circuit is then completed through the wire 69, contact member 35, pin 70, disk 31 and through the grounded parts of the shutter mechanism and casing to the jack 66.

The disk 31 moves only a partial revolution, but as before explained, moves relatively slowly since the pallet 43 has considerable mass and, therefore, a relatively great amount of time is consumed in making the fraction of a revolution for disk 31. After contact has been made and just prior to completion of the partial revolution for the disk as terminated by the pallet reaching the end of the toothed portion thereof, a second projection or pin 71 engages the cam surface 18 on the lever 17 thereby to swing that lever clockwise about the pivot 16 and to withdraw the nose 15 from the lug 19 thereby to release the master member and initiate the cycle of movement of those parts which open and close the shutter blades themselves.

When one of those flash devices having so-called zero lag is to be used, the setting of the pointed 37 opposite zero on the milliseconds scale results in the movement of the non-conducting block 34 through such an angle that the greatest amount of movement of disk 31 will not bring pin 70 into contact with the spring member 35. However, the movement of the non-conducting member 34 does effect a contact between the extension 72 which projects to the opposite side of the block 34, into engagement with a spring strip 73 which is in turn held on bracket 45 and connected to a second insulated wire 74 for extending the circuit about the internal portion of the shutter casing to a spring contact member 75 adjacent the master member. The wire and this contact member 75 are supported by a small clip 76 at that part of the casing. The result of effecting this zero setting is to carry the circuit through wire 69, contact member 35, projection 72, strip 73, wire 74 to the contact member 75 which is so set or adjusted as to be engaged by the nearest edge of the master member arm 77 as the master member moves from its set to its untensioned position. The adjustment of the contact member 75 is such that the circuit will be completed just as the shutter blades have reached their fully opened position. Since the so-called instantaneous flash discharge tubes have no appreciable lag, the full intensity of illumination will come at the initial opening of the shutter thereby being directly timed by movement of parts more intimately connected with the shutter blade mechanism itself.

Referring to Fig. 6, the disk 31 is shown after release by disengaging the latch 56 from the notch 57. This figure shows the pin 71 engaging the cam end of lever 17 and upon rotation throughout a few more degrees, the pin will have swung that lever clockwise as above described.

While the preferred embodiment of the invention has been described by reference to a construction in which the circuit is grounded, it is obvious that instead of grounding one side of said circuit, additional conductors may be employed for carrying current from the jack 66 which would then be insulated from the casing and to the contact pin 70 through some suitable movable electrical contacting member. While it is more desirable to effect zero millisecond contact as described with respect to Fig. 3, the separate provision for that type of flash discharge tube may be dispensed with and the block 34 and contact spring member 35 modified so as to effect the necessary circuit closing movement for all types of flash mechanisms having lags varying from zero to any practical maximum.

The actual amount of rotation imparted to the disk 31 may be varied within limits, although the active movement imparted to the disk is necessarily something considerably less than a complete revolution and by the term "partial revolution," applicant refers to such angular movement as is necessary to effect contact to flash the bulb and to provide a period of time delay after which the releasing of the master member is accomplished through pin 71 and release lever 17, etc., or other equivalent devices.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In combination with a photographic shutter having a blade mechanism, a master member, setting means for tensioning said master member and shutter releasing means, an improved flash bulb circuit and synchronizer which comprises a pivot, a non-conducting member oscillatable on said pivot and a circuit completing contact means carried by said member, a conducting timer disk rotatable upon said pivot and axially spaced from said member and contact means, a latch for said disk releasable by said shutter releasing means and resilient means for urging said disk to a position to be engaged by said latch, a projection from said disk positioned to engage said contact means upon release of the disk, and setting means for differently positioning the non-conducting member and contact means carried thereby in accordance with the lag of a flash bulb, said disk and contact means being electrically connected to opposite sides of said flash bulb circuit, means to retard the movement of said disk after release and to limit its travel to a part only of a complete revolution, a spring means engageable by said master member for tensioning it as that master member is set, said spring means having engagement with said disk and being of greater force when tensioned than the said return resilient means for that disk, a master member latching means terminating in a cam surface adjacent said disk and a projection from said disk for engaging and camming said latching means to a position to release the master member when said disk has moved throughout substantially its extent of travel.

2. In combination with a photographic shutter having a blade mechanism, a master member, setting means for tensioning said master member and shutter releasing means, an improved flash bulb circuit and synchronizer which comprises a pivot, a non-conducting member oscillatable on said pivot and a circuit completing contact means carried by said member, a conducting timer disk rotatable upon said pivot and axially spaced from said member and contact means, a latch for said disk releasable by said shutter releasing means and a spring for urging said disk to a position in which said latch engages a restraining notch therein, a projecting pin extending from said disk and into the pathway of said contact means for engagement therewith and for completing the circuit upon release of said disk and movement thereof through a predetermined angular extent, said disk and contact means being electrically connected to opposite sides of said flash bulb circuit, means to retard the movement of said disk after release and to limit its travel to a part only of a complete revolution, said means comprising a pallet engageable with a series of teeth at the periphery of said disk, a spring means comprising a pivot plate, an arm projecting from said plate and an elongated arcuate spring strip extending to and engaging within a notch in said timer disk, an abutment on said master member engageable with the projecting arm for increasing the tension in said spring means so that the force exerted thereby shall be substantially greater than that of the said spring means for returning the timer disk to latched position, a master member latch means comprising a pivoted latch member and actuating arm having adjacent said disk a beveled cam surface, and a projection from said disk for engaging said cam surface to withdraw said latch from said master member to release the latter as said timer disk is moved throughout a substantially angular portion of its travel.

3. In combination with a photographic shutter having a blade mechanism, a master member, setting means for tensioning said master member and shutter releasing means, an improved flash bulb circuit and synchronizer which comprises a pivot, a non-conducting member oscillatable on said pivot and a circuit completing contact means carried by said member, a conducting timer disk rotatable upon said pivot and axially spaced from said member and contact means, a latch for said disk releasable by said shutter releasing means and resilient means for urging said disk to a position to be engaged by said latch, a projection from said disk positioned to engage said contact means upon release of the disk, and setting means for differently positioning the non-conducting member and contact means carried thereby in accordance with the lag of a flash bulb, said disk and contact means being electrically connected to opposite sides of said flash bulb circuit, means to retard the movement of said disk after release and to limit its travel to a part only of a complete revolution, a spring means engageable by said master member for tensioning it as that master member is set, said spring means comprising a pivoted plate, an arm projecting from said plate and engageable by a cooperating abutment on the master member, and an elongated spring strip arched to provide initial tension and having means for connecting its relatively free end to said timer disk for actuation thereof, said spring strip having substantially greater tension therein when said master member is set than the said spring means for returning the disk to initial, latched position, a master member latching means terminating in a cam surface adjacent said disk and a projection from said disk for engaging and camming said latching means to a position to release the master member when said disk has moved throughout substantially its extent of travel.

4. In combination with a photographic shutter having a blade mechanism, a master member, setting means for tensioning said master member and shutter releasing means, an improved flash bulb circuit and synchronizer which comprises a pivot, a non-conducting member oscillatable on said pivot and a circuit completing contact means carried by said member, said circuit completing contact means being formed as a spring strip of conducting material inset in said non-conducting member and extending in a generally concentric relation to the pivot and for part of the circumferential extent of said non-conducting member, a conducting timer disk rotatable upon said pivot and axially spaced from said member and contact means, said timer disk having projecting therefrom a contact pin for engagement with said spring contact means and a second projecting pin for engagement with a means for releasing said master member and a notch for engagement by a latch, said latch being connected to and releasable by said shutter releasing means, a spring for urging said disk to a position to be engaged by said latch, setting means functioning upon said non-conducting contact carrying member for positioning it so that said contact member carried thereby may be engaged after a predetermined angular travel of said disk in accordance with the lag of a particular flash bulb, said disk and contact means being electrically connected to opposite sides of said flash bulb circuit, means to retard the movement of said disk after release and to limit its travel to a part only of a complete revolution, a spring means engageable by said master member for tensioning it as that master member is set, said spring means having engagement with said disk and being of greater force when tensioned than the said return spring for that disk, a master member latching means terminating in a cam surface adjacent said disk and a projection from said disk for engaging and camming said latching means to a position to release the master member when said disk has moved throughout substantially its extent of travel.

5. Mechanism as defined in claim 4 further characterized by a circumferentially adjustable setting member having a pointer for cooperation with a milliseconds scale at the face of said shutter casing and an inwardly projecting means for engagement with said non-conducting, oscillatable member for effecting different positions thereof in accordance with the lag of a particular flash bulb employed.

6. Mechanism as defined in claim 4 further characterized by the provision of a slot in said non-conducting, oscillatable member, and a circumferentially adjustable setting member having a pointer for cooperation with a milliseconds scale at the face of said shutter casing and a projection from said member engaging within said slot and means for temporarily restraining said setting member in an adjusted position.

7. In combination with a photographic shutter having a blade mechanism, a master member, setting means for tensioning said master member and a shutter releasing means, an improved flash bulb circuit and synchronizer which comprises a pivot, a non-conducting member oscillatable on said pivot and a circuit completing contact means carried by said member, a conducting timer disk rotatable upon said pivot and axially spaced from said member and contact means, a latch for said disk releasable by said shutter releasing means and resilient means for urging said disk to a position to be engaged by said latch, a projection from said disk positioned to engage said contact means upon release of the disk, and setting means for differently positioning the non-conducting member and contact means carried thereby in accordance with the lag of a particular flash bulb, said disk and contact means being electrically connected to opposite sides of said flash bulb circuit, said electrical connections comprising an insulated and a grounded connecting means entering said shutter casing, current carrying means from said grounded means to the circuit completing contact means carried by the non-conducting member and other means effective upon setting the synchronizer for zero lag, for carrying the current through a second conductor to a spring contact member adjacent said master member, said spring contact member being in the pathway of a projecting portion of said master member thereby to complete the circuit upon movement of that member to a position wherein the shutter blades will have been substantially fully opened, and means to retard the movement of said disk after release and to limit its travel to a part only of a complete revolution, a spring means engageable by said master member for tensioning it as that master member is set, said spring means having engagement with said disk and being of greater force when tensioned than the said return resilient means for that disk, a master member latching means terminating in a cam surface adjacent said disk and a projection from said disk for engaging and camming said latching means to a position to release the master member when said disk has moved throughout substantially its extent of travel.

FREDERICK P. WILLCOX.

REFERENCES CITED

The following references are of record in the file of this patent:

UNITED STATES PATENTS

| Number | Name | Date |
| --- | --- | --- |
| 2,319,086 | Riddell | May 11, 1943 |
| 2,355,825 | Schwarz | Aug. 15, 1944 |
| 2,358,941 | Schwarz | Sept. 26, 1944 |
| 2,404,526 | Pirwitz | July 23, 1946 |
| 2,429,972 | Aiken | Nov. 4, 1947 |
| 2,448,876 | Fuerst | Sept. 7, 1948 |